(12) United States Patent
Eromaki et al.

(10) Patent No.: US 9,435,981 B2
(45) Date of Patent: Sep. 6, 2016

(54) OPTICAL ELEMENT CONTROL USING MULTIPLE ACTUATORS

(75) Inventors: Marko Eromaki, Tampere (FI); Mikko Antti Ollila, Tampere (FI)

(73) Assignee: Nokia Technologies Oy, Espoo (FI)

( * ) Notice: Subject to any disclaimer, the term of this patent is extended or adjusted under 35 U.S.C. 154(b) by 12 days.

(21) Appl. No.: 14/130,070

(22) PCT Filed: Jul. 1, 2011

(86) PCT No.: PCT/IB2011/052929
§ 371 (c)(1),
(2), (4) Date: Dec. 30, 2013

(87) PCT Pub. No.: WO2013/005074
PCT Pub. Date: Jan. 10, 2013

(65) Prior Publication Data
US 2014/0146223 A1    May 29, 2014

(51) Int. Cl.
*H04N 5/232* (2006.01)
*G02B 7/09* (2006.01)
*G02B 7/08* (2006.01)

(52) U.S. Cl.
CPC .. *G02B 7/09* (2013.01); *G02B 7/08* (2013.01)

(58) Field of Classification Search
CPC .............................. G02B 7/09; H04N 5/23287
USPC ......................................................... 348/357
See application file for complete search history.

(56) References Cited

U.S. PATENT DOCUMENTS

| 5,727,241 A | 3/1998 | Yamano et al. | |
|---|---|---|---|
| 2007/0047938 A1* | 3/2007 | Suzuki et al. | 396/89 |
| 2008/0024016 A1* | 1/2008 | Liu et al. | 310/15 |
| 2010/0214666 A1 | 8/2010 | Fukino | |
| 2011/0058093 A1 | 3/2011 | Kim | |
| 2011/0141587 A1 | 6/2011 | Schworm et al. | |

FOREIGN PATENT DOCUMENTS

| KR | 2011 0030868 A | 3/2011 |
|---|---|---|
| WO | WO 2009072748 A1 | 6/2009 |

OTHER PUBLICATIONS

International Search Report for Application No. PCT/IB2011/052929 dated Mar. 28, 2012.
Written Opinion from International Patent Application No. PCT/IB2011/052929 dated Mar. 28, 2012.

* cited by examiner

*Primary Examiner* — Usman Khan
(74) *Attorney, Agent, or Firm* — Alston & Bird LLP

(57) ABSTRACT

Methods, apparatuses and a computer program are provided. An apparatus comprises: one or more optical elements, a first actuator and a second actuator. The first actuator may be configured to drive the one or more optical elements from a rest position across a first displacement, and configured to drive the one or more optical elements from the rest position across a second displacement. The second actuator may be configured to assist the first actuator in controlling movement of the one or more optical elements across a portion, and not all, of the first displacement, and configured to assist the first actuator in controlling movement of the one or more optical elements in the second direction across a portion, and not all, of the second displacement. The first and second actuators may be biased such that, when no electrical power is supplied to the first and second actuators, they bring the one or more optical elements to a rest position from which the one or more optical elements are driven.

18 Claims, 10 Drawing Sheets

Figure 1:
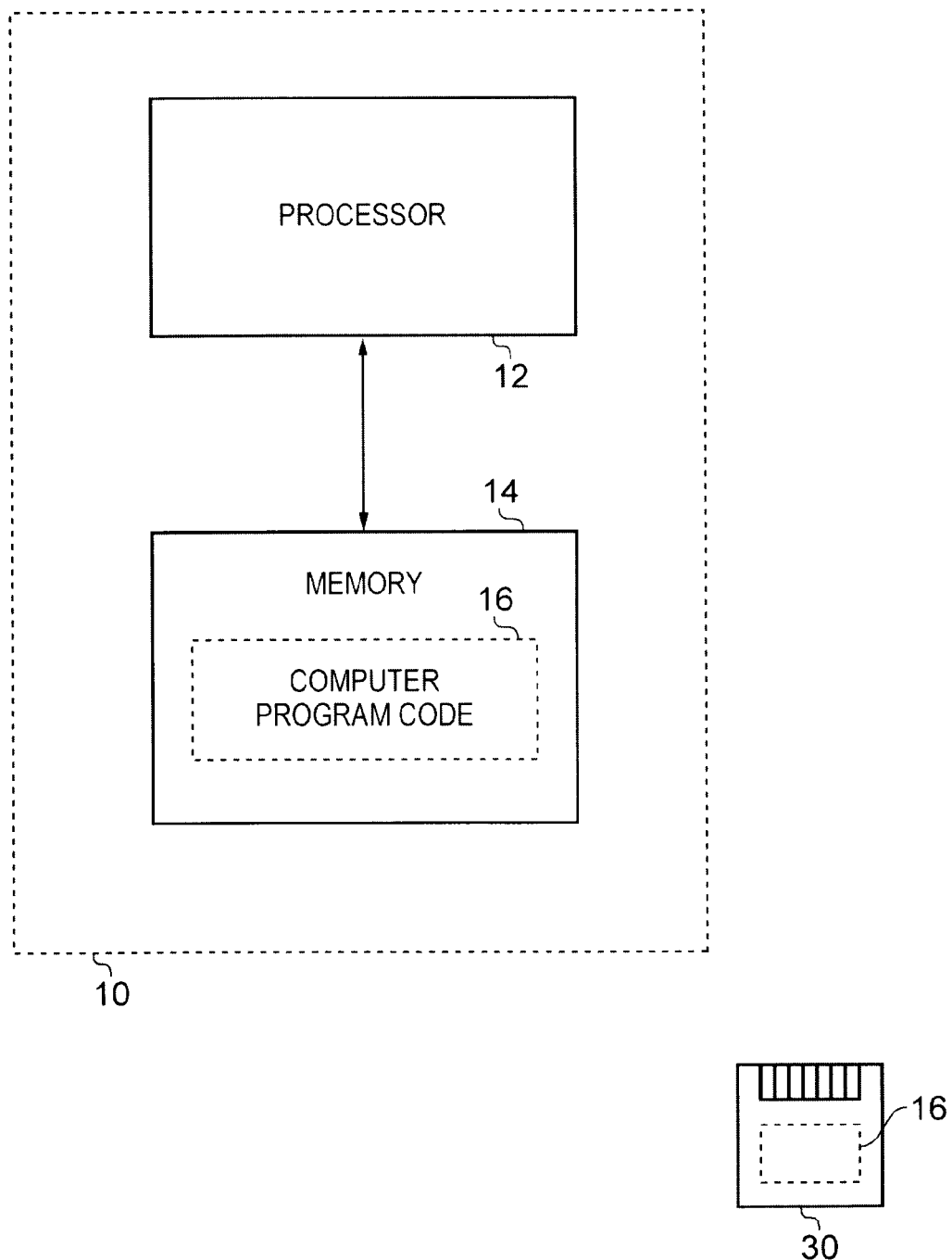

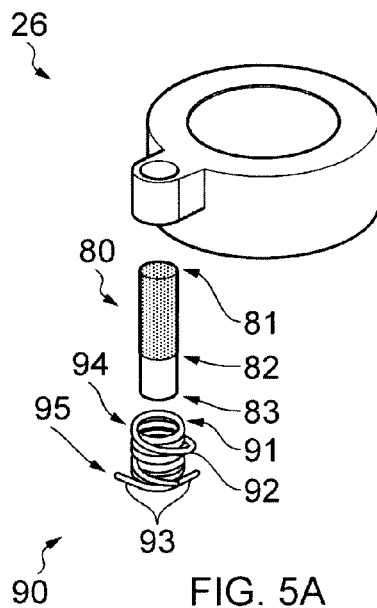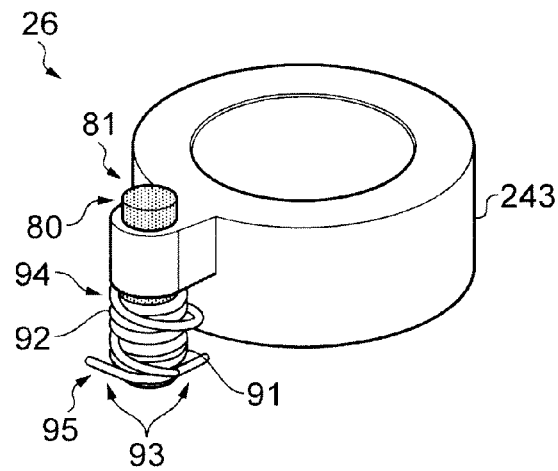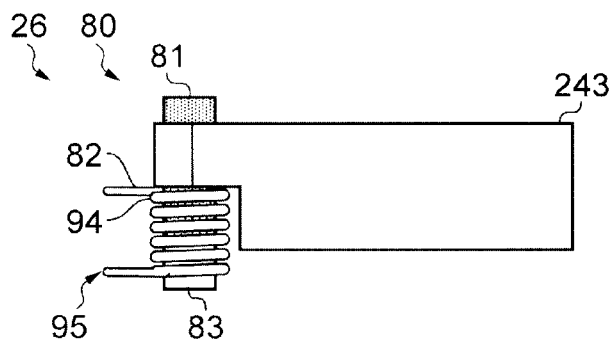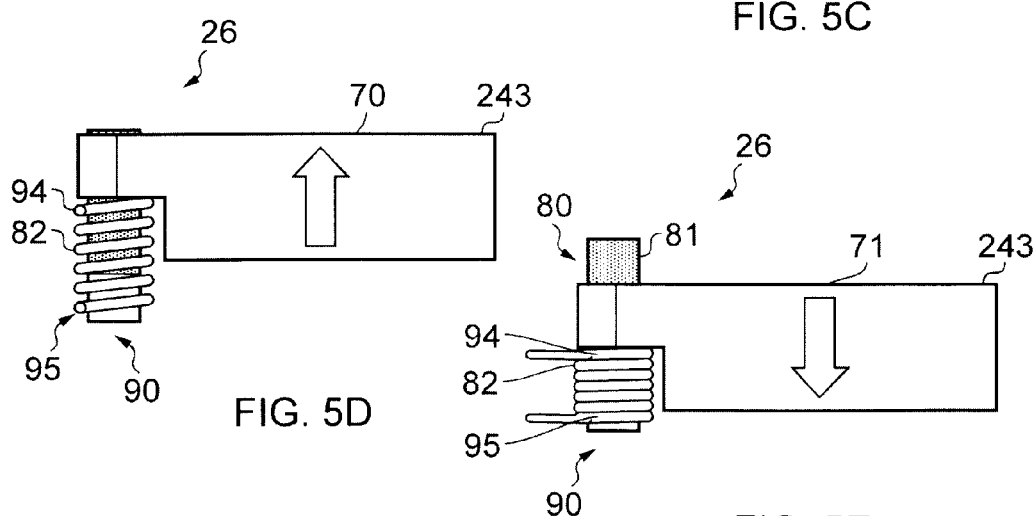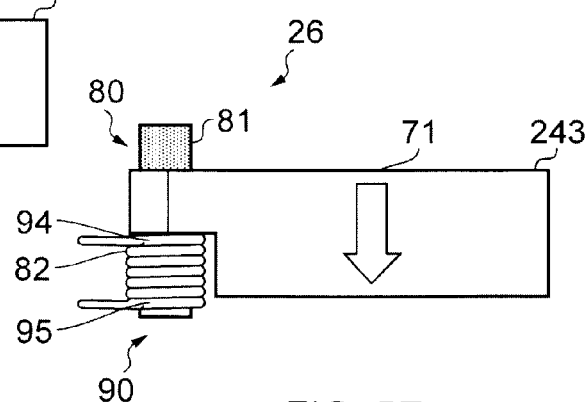
FIG. 5A
FIG. 5B
FIG. 5C
FIG. 5D
FIG. 5E

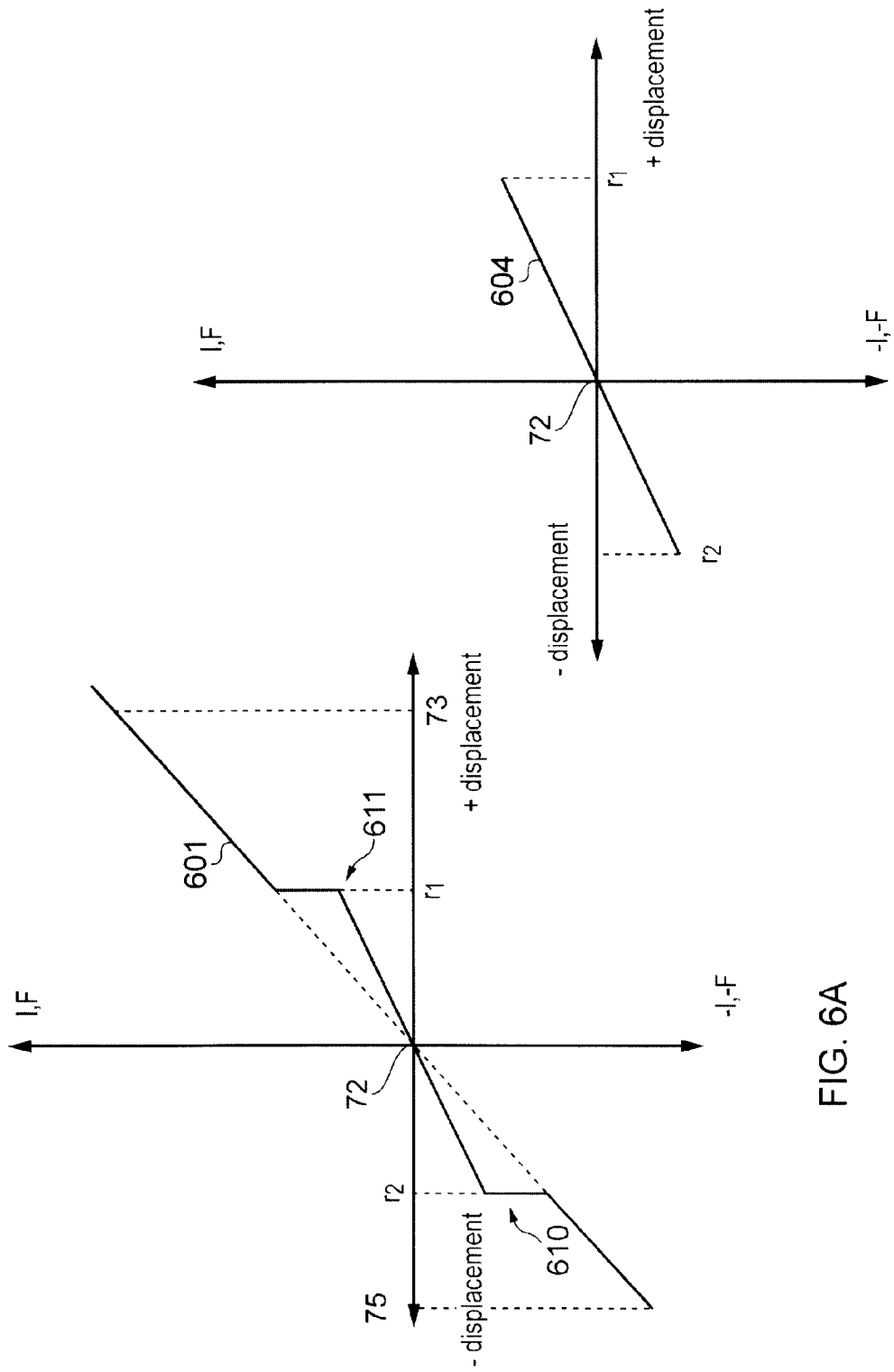

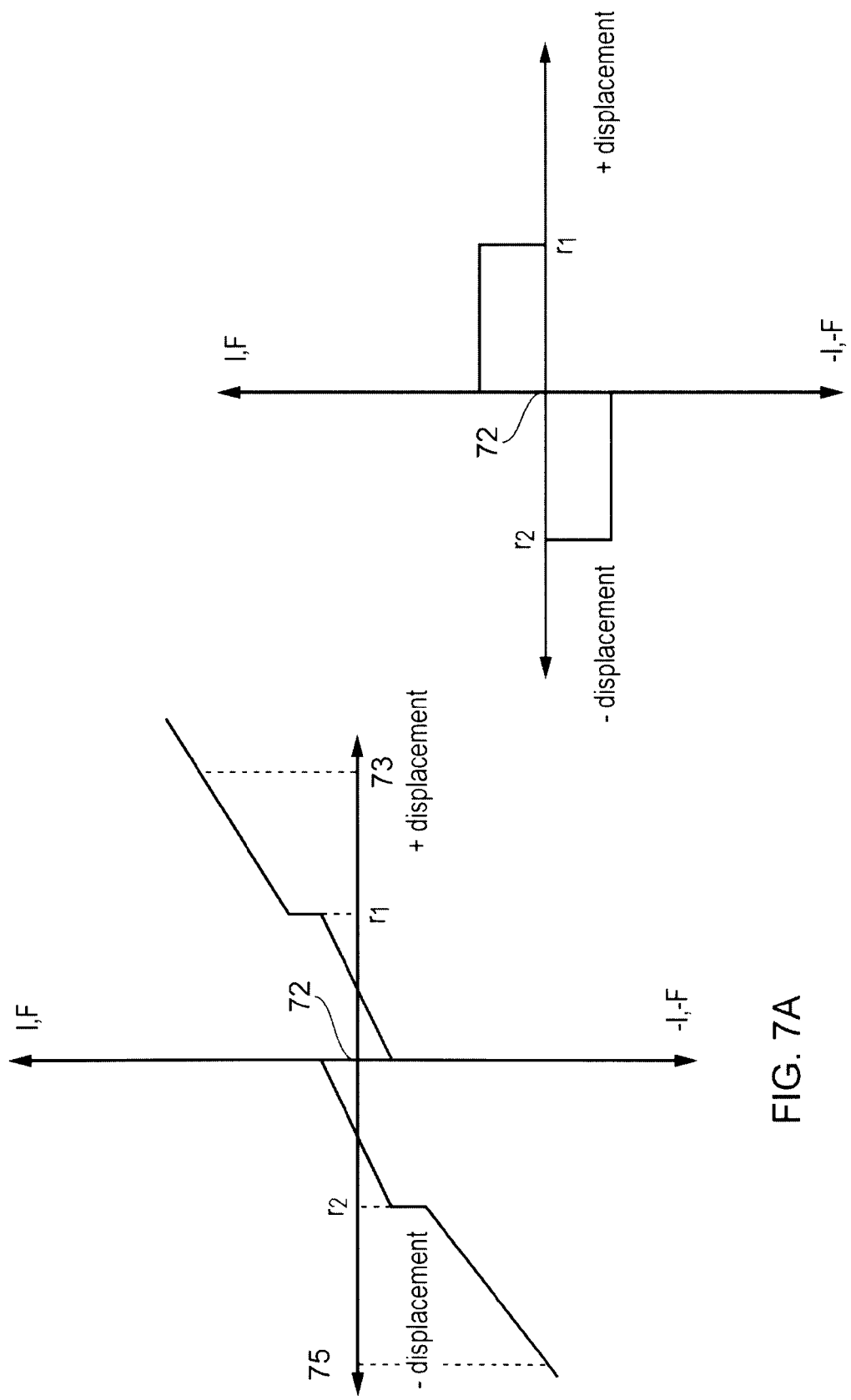

OPTICAL ELEMENT CONTROL USING MULTIPLE ACTUATORS

TECHNOLOGICAL FIELD

Embodiments of the present invention relate to controlling the position of one or more optical elements in a camera. In particular, they relate to controlling the position of one or more optical elements in a camera to enable the camera to place an image into focus.

BACKGROUND

A camera may include one or more optical elements, such as one or more lenses, which are used to focus an image onto an image sensor. The camera may, for example, comprise an actuator that moves the one or more lenses to enable the lens (or lenses) to place objects at different distances into focus at the image sensor.

BRIEF SUMMARY

According to some, but not necessarily all, embodiments of the invention, there is provided an apparatus, comprising: one or more optical elements; a first actuator configured to drive the one or more optical elements from a rest position across a first displacement, and configured to drive the one or more optical elements from the rest position across a second displacement, different from the first displacement; and a second actuator configured to assist the first actuator in controlling movement of the one or more optical elements across a portion, and not all, of the first displacement, and configured to assist the first actuator in controlling movement of the one or more optical elements in the second direction across a portion, and not all, of the second displacement.

According to some, but not necessarily all, embodiments of the invention, there is provided a method, comprising: moving one or more optical elements from a rest position across a first displacement, wherein a first actuator drives the one or more optical elements across the first displacement and a second actuator assists the first actuator to control movement of the one or more optical elements across a portion, and not all, of the first displacement; and moving the one or more optical elements from the rest position across a second displacement, different from the first displacement, wherein the first actuator drives the one or more optical elements across the second displacement and the second actuator assists the first actuator to control movement of the one or more optical elements across a portion, and not all, of the second displacement.

According to some, but not necessarily all, embodiments of the invention, there is provided an apparatus, comprising: one or more optical elements; moving means for moving the one or more optical elements from a rest position across a first displacement, and for moving the one or more optical elements from the rest position across a second displacement, different from the first displacement; and assisting means for assisting the moving means in moving the one or more optical elements across a portion, and not all, of the first displacement, and for assisting the first actuator in moving the one or more optical elements across a portion, and not all, of the second displacement.

According to some, but not necessarily all, embodiments of the invention, there is provided An apparatus, comprising: at least one processor; and at least one memory storing computer program code, wherein the computer program code is configured to, with the at least one processor, cause the apparatus to at least: control a first actuator to drive one or more optical elements from a rest position across a first displacement; control a second actuator to assist the first actuator to control movement of the one or more optical elements across a portion, and not all, of the first displacement; control the first actuator to drive the one or more optical elements from the rest position across a second displacement, different from the first displacement; and control the second actuator to assist the first actuator to control movement of the one or more optical elements across a portion, and not all, of the second displacement.

According to some, but not necessarily all, embodiments of the invention, there is provided a method, comprising: controlling a first actuator to drive one or more optical elements from a rest position across a first displacement; controlling a second actuator to assist the first actuator to control movement of the one or more optical elements across a portion, and not all, of the first displacement; controlling the first actuator to drive the one or more optical elements from a rest position across a second displacement, different from the first displacement; and controlling the second actuator to assist the first actuator to control movement of the one or more optical elements across a portion, and not all, of the second displacement.

According to some, but not necessarily all, embodiments of the invention, there is provided a non-transitory computer readable medium storing computer program code that is configured to, working with at least one processor, cause at least the following to be performed: controlling a first actuator to drive one or more optical elements from a rest position across a first displacement; controlling a second actuator to assist the first actuator to control movement of the one or more optical elements across a portion, and not all, of the first displacement; controlling the first actuator to drive the one or more optical elements from the rest position across a second displacement, different from the first displacement; and controlling the second actuator to assist the first actuator to control movement of the one or more optical elements across a portion, and not all, of the second displacement.

According to some, but not necessarily all, embodiments of the invention, there is provided an apparatus, comprising: one or more optical elements; first and second actuators, biased to bring the one or more optical elements towards a rest position, and configured to enable the one or more optical elements to move in a first direction from the rest position and in a second direction from the rest position, wherein when the one or more optical elements are moved from the rest position in the first direction, a force is initially provided in the second direction by the first actuator and in the first direction by the second actuator, and when the one or more optical elements are moved from the rest position in the second direction, a force is initially provided in the first direction by the first actuator and in the second direction by the second actuator.

According to some, but not necessarily all, embodiments of the invention, there is provided a method, comprising: controlling first and second actuators, biased to bring one or more optical elements towards a rest position, to move the one or more optical elements in a first direction from the rest position, wherein when the one or more optical elements are moved in the first direction from the rest position, a force is initially provided in the second direction by the first actuator and in the first direction by the second actuator; and controlling the first and second actuators to move the one or more optical elements in a second direction from the rest position, wherein when the one or more optical elements are moved in the second direction from the rest position, a force is initially provided in the first direction by the first actuator and in the second direction by the second actuator.

According to some, but not necessarily all, embodiments of the invention, there is provided an apparatus, comprising: at least one processor; and at least one memory storing computer program code, wherein the computer program code is configured to, with the at least one processor, cause the apparatus to at least: control first and second actuators, biased to bring one or more optical elements towards a rest position, to move the one or more optical elements in a first direction from the rest position, wherein when the one or more optical elements are moved in the first direction from the rest position, a force is initially provided in the second direction by the first actuator and in the first direction by the second actuator; and control the first and second actuators to move the one or more optical elements in a second direction from the rest position, wherein when the one or more optical elements are moved in the second direction by the first and second actuators, a force is initially provided in the first direction by the first actuator and in the second direction by the second actuator.

According to some, but not necessarily all, embodiments of the invention, there is provided an apparatus, comprising: means for controlling first and second actuators, biased to bring one or more optical elements towards a rest position, to move the one or more optical elements in a first direction away from the rest position, wherein when the one or more optical elements are moved from the rest position in the first direction by the first and second actuators, a force is initially provided in the second direction by the first actuator and in the first direction by the second actuator; and means for controlling the first and second actuators to move the one or more optical elements in a second direction from the rest position, wherein when the one or more optical elements are moved in the second direction from the rest position by the first and second actuators, a force is initially provided in the first direction by the first actuator and in the second direction by the second actuator.

According to some, but not necessarily all, embodiments of the invention, there is provided a non-transitory computer readable medium storing computer program code that is configured to, working with at least one processor, cause at least the following to be performed: controlling first and second actuators, biased to bring one or more optical elements towards a rest position, to move the one or more optical elements in a first direction from the rest position, wherein when the one or more optical elements are moved in the first direction from the rest position by the first and second actuators, a force is initially provided in the second direction by the first actuator and in the first direction by the second actuator; and controlling the first and second actuators to move the one or more optical elements in a second direction from the rest position, wherein when the one or more optical elements are moved in the second direction from the rest position by the first and second actuators, a force is initially provided in the first direction by the first actuator and in the second direction by the second actuator.

BRIEF DESCRIPTION

Figure 2:
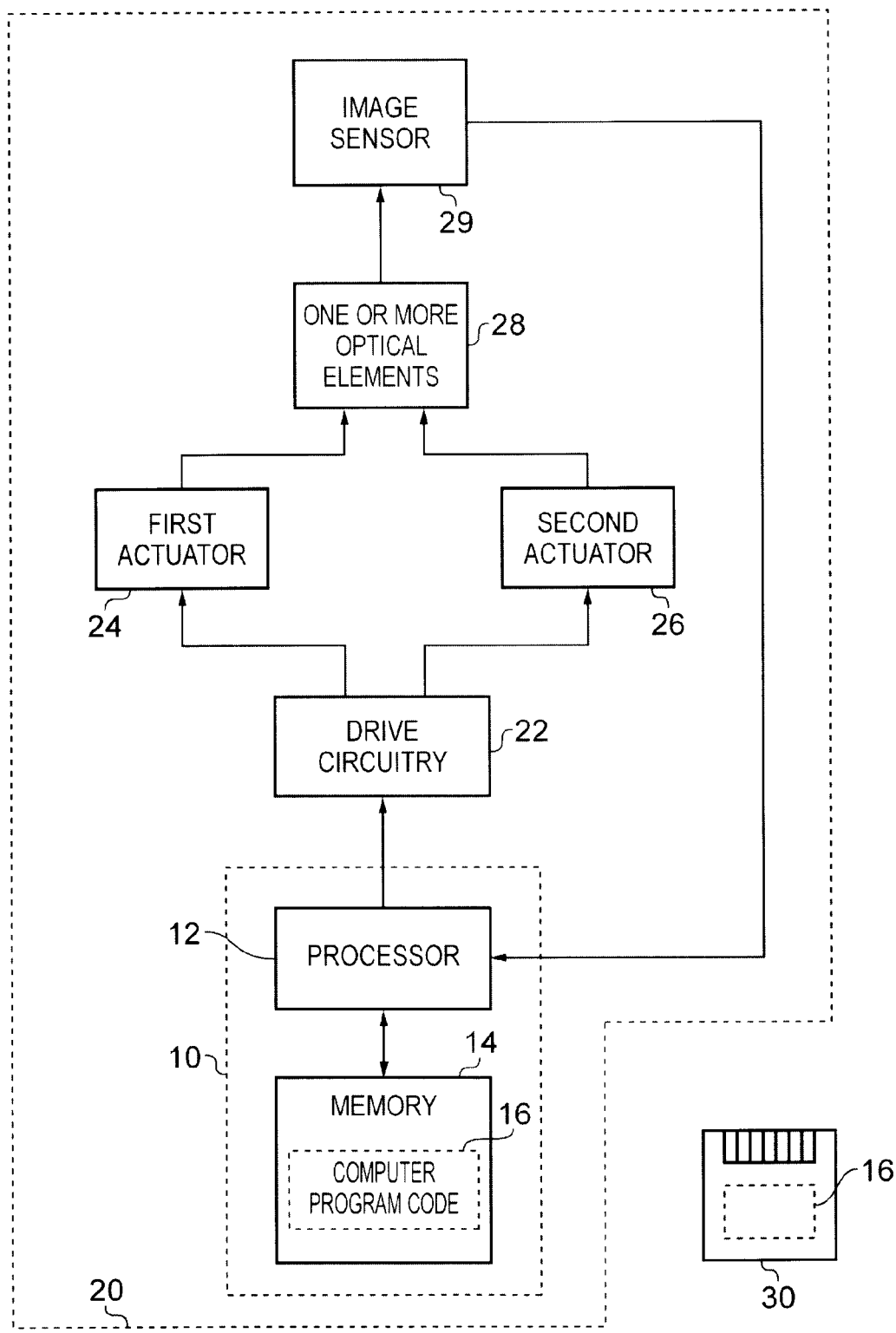
Figure 3:
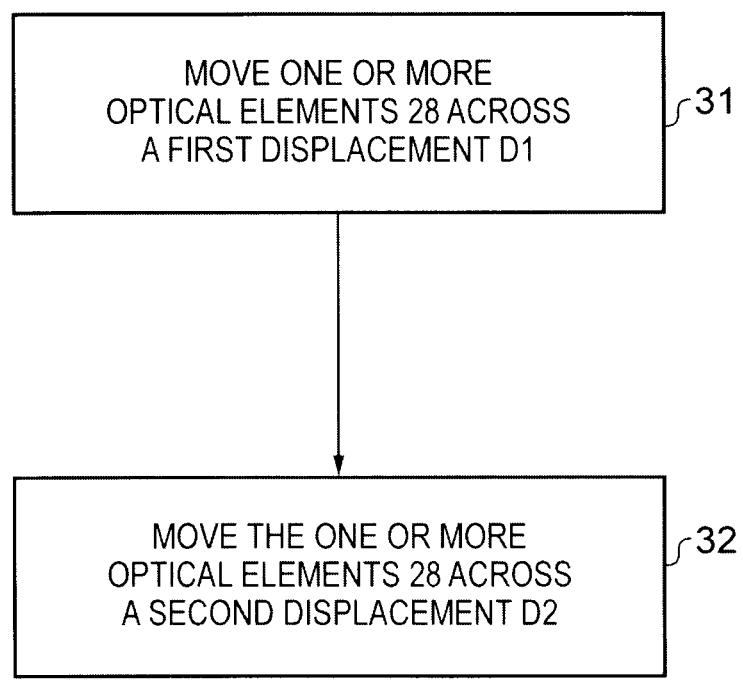
Figure 4:
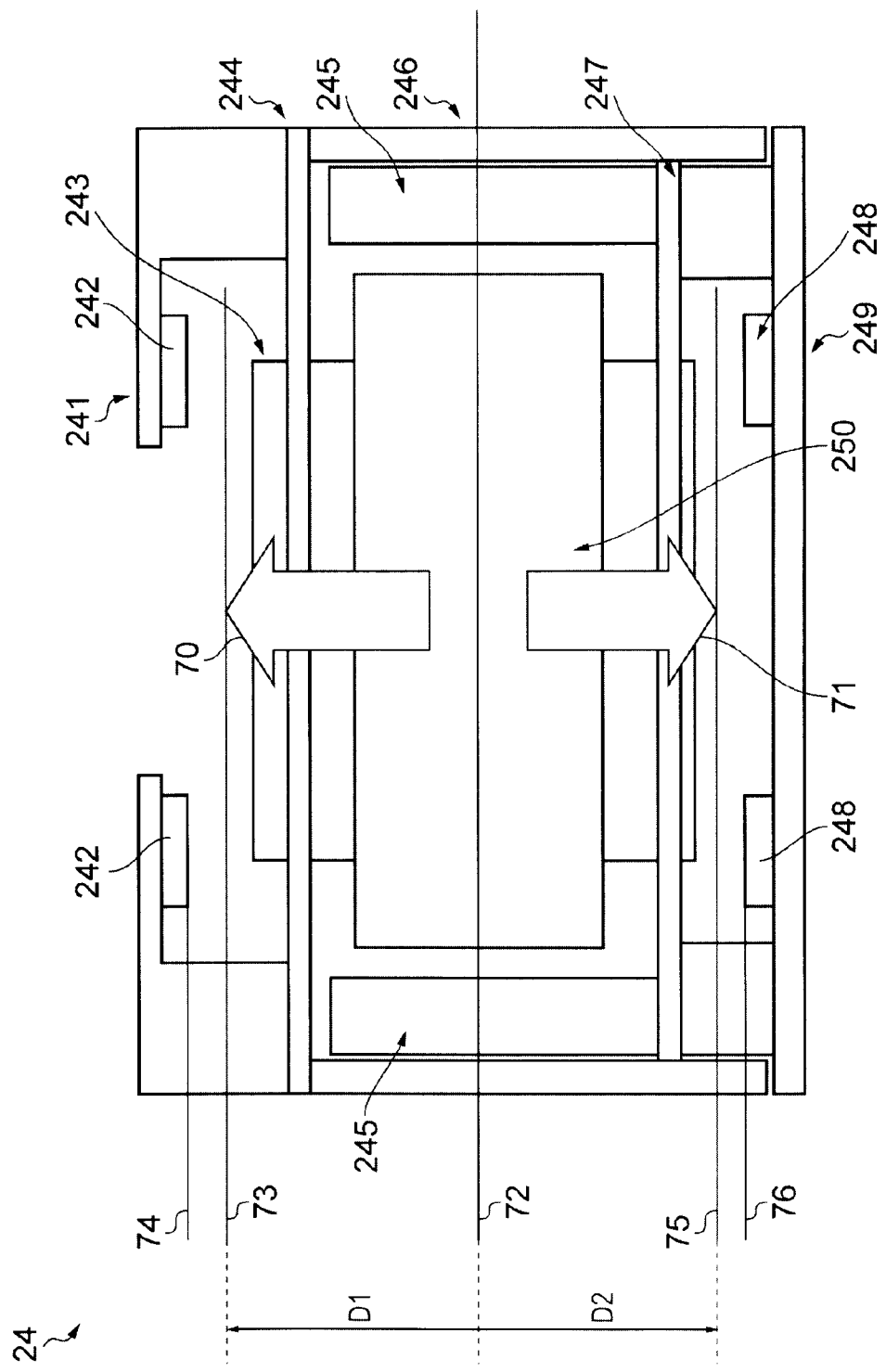
Figure 6C:
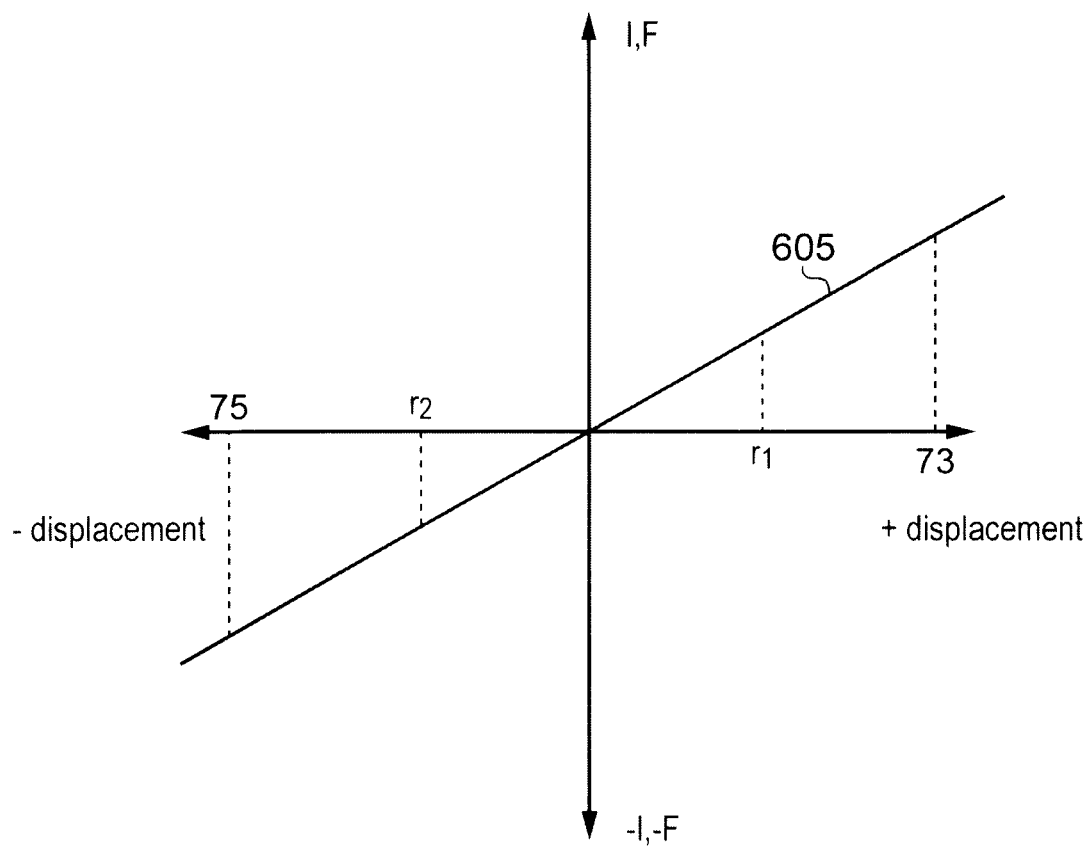
Figure 7C:
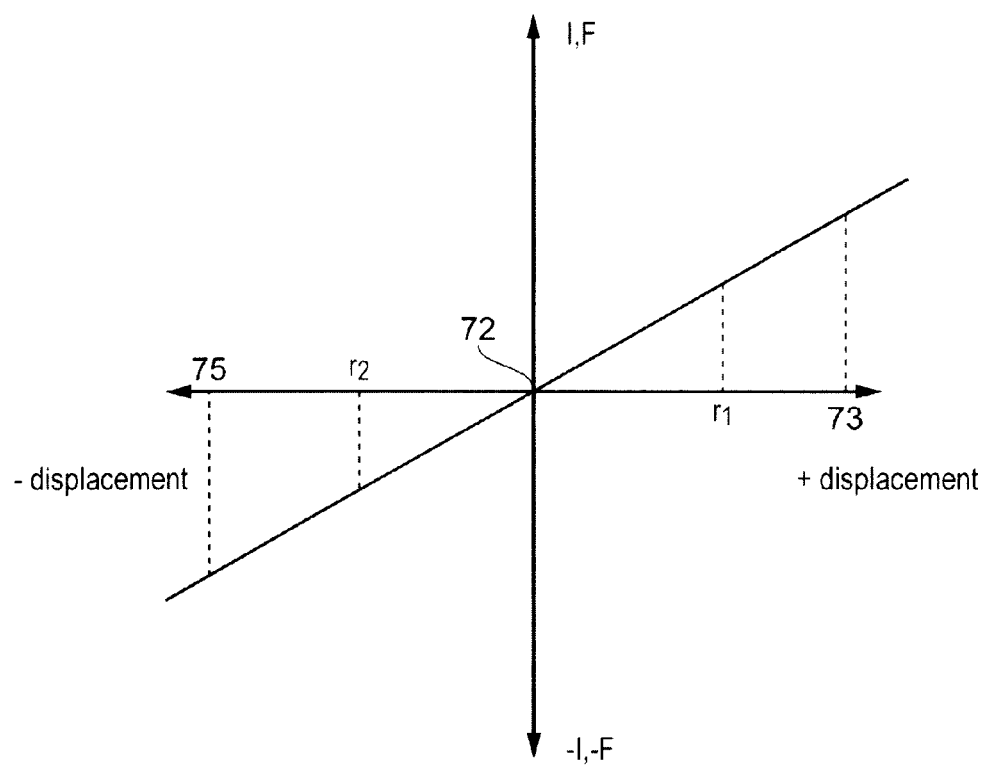
Figure 8:
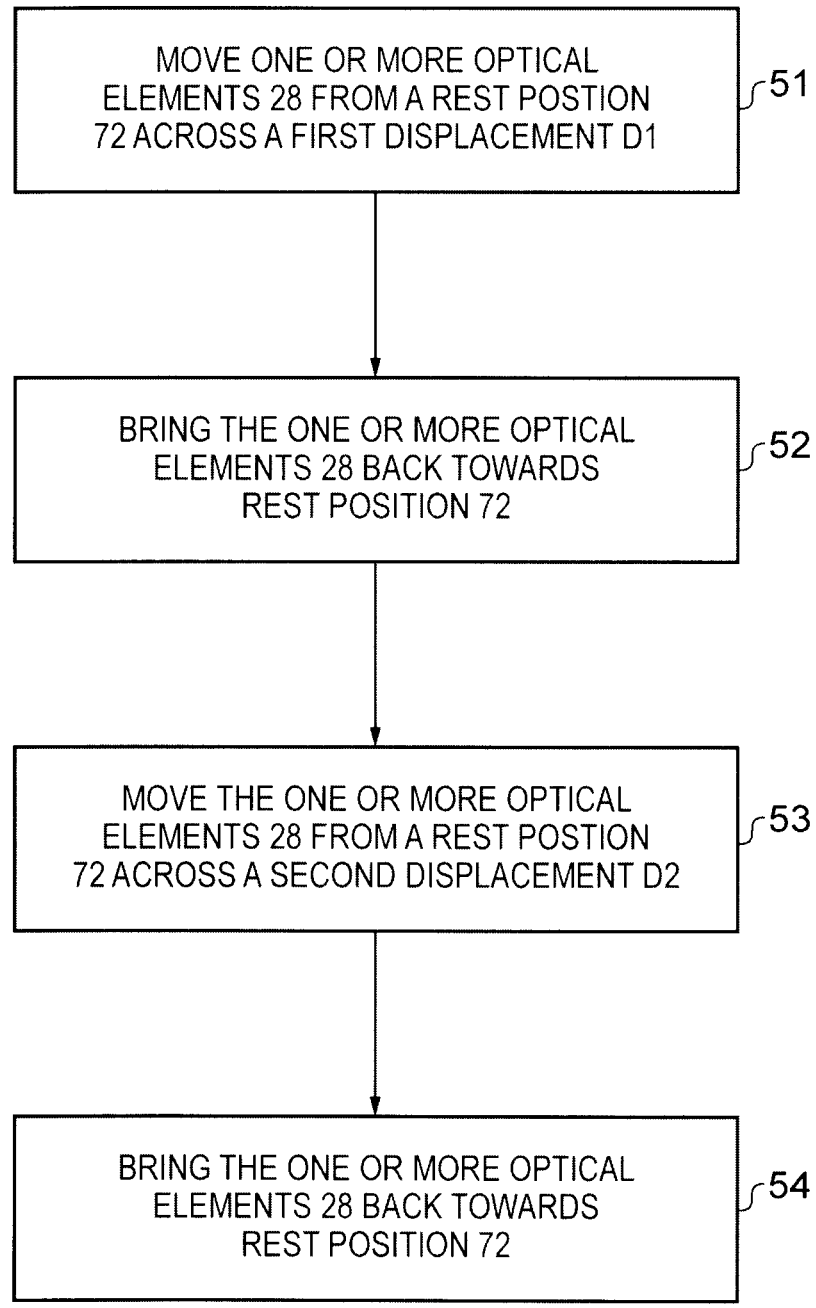

For a better understanding of various examples of embodiments of the present invention reference will now be made by way of example only to the accompanying drawings in which:

FIG. 1 illustrates an apparatus;
FIG. 2 illustrates a further apparatus;
FIG. 3 illustrates a flow chart of a first method;
FIG. 4 illustrates an example of a first actuator;
FIGS. 5A to 5E illustrate an example of a second actuator
FIG. 6A illustrates a displacement versus current/force graph for a first actuator in a first implementation;
FIG. 6B illustrates a displacement versus current/force graph for a second actuator in the first implementation;
FIG. 6C illustrates a displacement versus current/force graph for the combination of the first and second actuators in the first implementation;
FIG. 7A illustrates a displacement versus current/force graph for a first actuator in a second implementation;
FIG. 7B illustrates a displacement versus current/force graph for a second actuator in the second implementation;
FIG. 7C illustrates a displacement versus current/graph for the combination of the first and second actuators in the second implementation; and
FIG. 8 illustrates a flow chart of a second method.

DETAILED DESCRIPTION

Embodiments of the invention relate to controlling the position of one or more optical elements in an apparatus such as a camera. Embodiments of the invention may, for example, enable precise control of the position of one or more optical elements. Embodiments of the invention may also mitigate or prevent the movement of one or more optical elements in response to user handshake.

The figures illustrate an apparatus 20, comprising: one or more optical elements 28; a first actuator 24 configured to drive the one or more optical elements 28 from a rest position 72 across a first displacement D1, and configured to drive the one or more optical elements 28 from the rest position 72 across a second displacement D2, different from the first displacement D1; and a second actuator 26 configured to assist the first actuator 24 in controlling movement of the one or more optical elements 28 across a portion, and not all, of the first displacement D1, and configured to assist the first actuator 24 in controlling movement of the one or more optical elements 28 in the second direction 71 across a portion, and not all, of the second displacement D2.

The figures also illustrate an apparatus 20, comprising: one or more optical elements 28; first and second actuators 24, 26, biased to bring the one or more optical elements 28 towards a rest position 72, and configured to enable the one or more optical elements 28 to move in a first direction 70 away from the rest position 72 and in a second direction 71 away from the rest position 72, wherein when the one or more optical elements 28 are moved in the first direction 70 from the rest position 72 by the first and second actuators 24, 26, a force is initially provided in the second direction 71 by the first actuator 24 and in the first direction 70 by the second actuator 26, and when the one or more optical elements 28 are moved in the second direction 71 from the rest position 72 by the first and second actuators 24, 26, a force is initially provided in the first direction 70 by the first actuator 24 and in the second direction 71 by the second actuator 26.

FIG. 1 illustrates a schematic of an apparatus 10 comprising at least one processor 12 and at least one memory 14. The apparatus 10 may, for example, be a chip or a chipset. Although a single processor 12 and a single memory 14 are illustrated in FIG. 1, in some implementations of the invention more than one processor 12 and/or more than one memory 14 is provided.

The processor 12 is configured to read from and write to the memory 14. The processor 12 may also comprise an output interface via which data and/or commands are output by the processor 12 and an input interface via which data and/or commands are input to the processor 12.

Although the memory 14 is illustrated as a single component it may be implemented as one or more separate components some or all of which may be integrated/removable and/or may provide permanent/semi-permanent/dynamic/cached storage.

The memory 14 stores computer program code 16 that controls the operation of the apparatus 10 when loaded into the processor 12. The computer program code 16 provides the logic and routines that enables the apparatus 10/20 to perform the methods illustrated in FIGS. 3 and 8. The processor 12 by reading the memory 14 is able to load and execute the computer program code 16.

The computer program code 16 may arrive at the apparatus 10/20 via any suitable delivery mechanism 30. The delivery mechanism 30 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program code 16. The delivery mechanism 30 may be a signal configured to reliably transfer the computer program code 16. The apparatus 10/20 may propagate or transmit the computer program code 16 as a computer data signal.

FIG. 2 illustrates a schematic of a further apparatus 20. The apparatus 20 may, for example, be a camera. In some embodiments of the invention, the apparatus 20 may be hand portable and may have further functionality. For example, the apparatus 20 may be configured to operate as a mobile telephone, a tablet computer, a games console and/or a portable music player.

The apparatus 20 illustrated in FIG. 2 comprises drive circuitry 22, a first actuator 24, a second actuator 26, one or more optical elements 28, an image sensor 29 and the apparatus 10 illustrated in FIG. 1. The elements 12, 14, 22, 24, 26, 28 and 29 are operationally coupled and any number or combination of intervening elements can exist (including no intervening elements).

In the example illustrated in FIG. 2, the processor 12 controls the first and second actuators 24, 26 via the drive circuitry 22. The drive circuitry 22 may, for example, enable a higher current to be supplied to the first and second actuators 24, 26 than would otherwise be the case if the first and second actuators 24, 26 were connected directly to the processor 12. In some embodiments, however, the first and second actuators 24, 26 may be connected directly to the processor 12.

The first actuator 24 may, for example, be a voice coil module (VCM) actuator or another type of actuator. The first actuator 24 may be operationally coupled to the one or more optical elements 28 (for example via an optical element housing) to enable the first actuator 24 to drive the one or more optical elements 28 in at least two different directions.

For instance, in some embodiments of the invention, the first actuator 24 may be biased (for example, resiliently biased) such that it returns the one or more optical elements 28 to a rest position, in the absence of electrical power (for example, in the form of a drive current) being input into the first actuator 24.

The first actuator 24 may be bi-directional in that it may drive the one or more optical elements 28 in two different directions from the rest position. For example, the first actuator 24 may be configured to drive the one or more optical elements 28 from the rest position, in a first direction, across a first displacement. The first actuator 24 may also be configured to drive the one or more optical elements 28 from the rest position, in a second direction, across a second displacement. The second direction might be opposite to the first direction.

The second actuator 26 may be configured to assist the first actuator 24 in controlling movement of the one or more optical elements 28 across a portion, and not all, of the first displacement. The second actuator 26 may also be configured to assist the first actuator 26 in controlling movement of the one or more optical elements 28 across a portion, and not all, of the second displacement.

The second actuator 26 may, for example, be a VCM actuator, a shape memory actuator (SMA) or another type of actuator. The second actuator 26 may be bi-directional in that it may drive the one or more optical elements 28 in both the first and second directions from the rest position.

The one or more optical elements 28 may, for example, be or comprise one or more lenses. The one or more optical elements 28 are configured to convey light to the image sensor 29 such that an object is placed into focus at the image sensor 29. The functional relationship between the one or more optical elements 28 and the image sensor 29 is illustrated schematically in FIG. 2.

Movement of the one or more optical elements 28 enables objects at different distances from the apparatus 20 to be placed into focus at the image sensor 29.

The image sensor 29 may be any type of image sensor. The image sensor 29 is configured to convert incident light into electrical image data and convey the image data to the processor 12.

A first method of embodiments of the invention will now be described with reference to FIG. 3. At block 31 of FIG. 3, the processor 12 controls movement of the one or more optical elements 28, in a first direction, from a rest position. The processor 12 controls the first actuator 24 to drive the one or more optical elements 28 across a first displacement. The processor 12 also controls the second actuator 26 to assist the first actuator 24 to control movement of the one or more optical elements 28 across a portion, and not all, of the first displacement.

The first actuator 24 may then return the one or more optical elements 28 to the rest position. At block 32 of FIG. 3, the processor 12 controls movement of the one or more optical elements 28, in a second direction, from the rest position. The processor 12 controls the first actuator 24 to drive the one or more optical elements 28 across the second displacement. The processor 12 also controls the second actuator 26 to assist the first actuator 24 to control movement of the one or more optical elements 28 across a portion, and not all, of the second displacement.

FIG. 4 illustrates a VCM example of the first actuator 24. The first actuator 24 illustrated in FIG. 4 comprises a cover 241, upper mechanical stoppers 242, an upper flexure spring 244, one or more permanent magnets 245, a yoke 246, a lower flexure spring 247, a coil 250, lower mechanical end stoppers 248 and a base 249.

In this example the coil 250 is mechanically coupled to (for example, wrapped around) an optical element housing 243, which houses the one or more optical elements 28. FIG. 4 illustrates a situation in which the optical element housing 243 and the one or more optical elements 28 are situated at the rest position 72.

The springs 244, 247 are resiliently biased towards the rest position 72. In the absence of electrical power being supplied to the coil 250, the springs 242, 247 of the first actuator 24 bring the housing 243 and the one or more optical elements 28 back to the rest position 72. The springs 244, 247 may be configured to hold the housing 243 and the one or more optical elements 28 in place at the rest position 72 if no electrical power is supplied the coil 250.

The permanent magnets 245 provide a magnetic field, the magnitude of which is increased by the yoke 246. When electrical power is supplied to the coil 250, the current in the coil 250 generates a magnetic field which interacts with the magnetic field of the one or more permanent magnets 245, causing the coil 250, the housing 243 and the one or more optical elements 28 to move.

When current is input into the coil 250 in one direction, a driving force is generated in the first direction 70, which causes the coil 250, the housing 243 and the one or more optical elements 28 to move from the rest position 72 in the first direction 70. An opposing force is provided by the biasing of the springs 244, 247. The opposing force may, for example, become greater the further the one or more optical elements 28 move from the rest position 72. The line 73 indicates the position of the upper end of the housing 243 when the one or more optical elements 28 are in the macro position (and focusing an image onto the image sensor 29 that is close up). The line 74 indicates the extremity to which the housing 243 may move, in the first direction 70, before it is prevented from moving further by the upper mechanical end stoppers 242.

If current is input into the coil 250 in the opposite direction when the coil 250 is in the rest position 72, it moves in a second direction 71. The line 75 indicates the position of the lower end of the housing 243 when the one or more optical elements 28 are in the infinity position (and focusing an image onto the image sensor 29 that is far away). The line 76 indicates the extremity to which the housing 243 may move, in the second direction 71, before it is prevented from moving further by the lower mechanical end stoppers 248.

The driving force provided by an actuator 24 such as that illustrated in FIG. 4 may vary non-linearly with the position of the housing 243 (and therefore also the position of the one or more optical elements 28 within the housing 243). For example, the rate of change in the driving force may vary in a non-linear fashion when the housing is positioned close to the rest position 72.

The driving force provided the actuator 24 may, for example, be directly proportional to the current supplied to the coil 250 of the actuator 24.

FIGS. 5A to 5E provide one example of a second actuator 26 for use in embodiments of the invention. The illustrated second actuator 26 comprises a permanent magnet arrangement 80 having an upper pole 81, a lower pole 83 and intermediate poles 82. The upper pole 81 and the lower poles 83 are alike, and both the upper and lower poles 81, 83 are unlike the intermediate poles 82. In this example, the upper and lower poles 81, 83 are south poles and the intermediate poles 82 are north poles, forming a south-north-south (S-N-S) permanent magnet arrangement.

The illustrated permanent magnet arrangement 80 may, for example, be formed by adhering two separate permanent magnets together at their respective north poles, or it could be formed as a unitary structure.

The illustrated second actuator 26 also comprises a helical coil 90 comprising an inner helical coil 91, an outer helical coil 92, and power terminals 93. In the illustrated example, the outer coil 92 has fewer turns than the inner coil 92. The inner coil 92 is wrapped around the permanent magnet arrangement 80. The helical coil 90 also has an upper end 94 and a lower end 95. The lower end of the coil 95 is attached (for example, adhered) to the lower end of the permanent magnet arrangement 80. The optical element housing 243, for housing the one or more optical elements 28, is attached (for example, adhered) to the upper end 94 of the coil 90.

FIG. 5A illustrates an exploded view of the example of the second actuator 26, FIG. 5B illustrates a perspective view and FIG. 5C illustrates a side view.

In use, the processor 12 causes a current to be applied to the helical coil 90 via the power terminals 95 (for instance, using the drive circuitry 22). This causes expansion or contraction of the helical coil 90 depending upon the direction in which the current is applied, resulting in upward or downward movement of the housing 243 and the one or more optical elements 28.

In FIG. 5D, a current is applied to the helical coil 90 such that the free upper end 94 of the coil 90 acts as a north pole. The free upper end 94 of the coil 90 is attracted to the upper south pole 81 of the permanent magnet arrangement 80 and repelled by the intermediate north poles 82. This causes the coil 90 to expand and drive the housing 243 and the one or more optical elements 28 in the first direction 70 (upwards in FIG. 5D).

In FIG. 5E, a current is applied to the helical coil 90 such that the free upper end 94 of the coil 90 acts as a south pole. The free upper end 94 is attracted to the intermediate north poles 82 of the permanent magnet arrangement 80 and repelled by the upper north pole 81. This causes the coil 90 to contract and drive the housing 243 and the one or more optical elements 28 in the second direction 71 (downwards in FIG. 5E).

The coil 90 is biased such that, when no current is applied to the coil 90, it provides a force which brings the housing 243 (and the one or more optical elements 28 contained therein) to the rest position 72 (illustrated in FIG. 4).

The second actuator 26 illustrated in FIGS. 5A to 5E is bi-directional in that it is configured to drive the housing 342 in two directions 70, 71 from the rest position 72. It will be appreciated that the actuator illustrated in FIGS. 5A to 5E is just one example an actuator that may be used as the second actuator 26 in embodiments of the invention.

In embodiments of the invention, the force provided by a first actuator 24 (such as that illustrated in FIG. 4) to move a housing 243 (and the one or more optical devices 28 contained therein) may vary non-linearly with the position of the one or more optical elements 28 from their rest position 72. This can make the position of the one or more optical elements 28 difficult to control accurately.

In embodiments of the invention, first and second actuators 24, 26 (such as those illustrated in FIGS. 4 and 5A to 5E) act in tandem to enable the position of the one or more optical elements 28 to be controlled accurately.

FIG. 6A illustrates a first example of a current/force versus displacement graph for the first actuator 24. The line 601 illustrates how the position of the housing 243 (and the one or more optical elements 28 contained therein) changes as the current that is input into the first actuator 24 changes. When no current is supplied to the first actuator 24, the biasing of the first actuator 24 is configured to bring the one or more optical elements to the rest position 72 (situated at the origin of the graph in FIG. 6A).

As the one or more optical elements 28 move further from the rest position 72, the force required to move the one or more optical elements 28 even further from the rest position 72 increases. This is because, as the one or more optical elements 28 move further from the rest position 72, the opposing force exerted on them by springs 244, 247 (acting to bring them back to the rest position 72) increases.

It can be seen from FIG. 6A that the line 601 is non-linear. For instance, in the example illustrated in FIG. 6A, there are two "steps" in the line 601 at 610 and 611 where there is a large increase in the force provided by the first actuator 24 over a very small distance.

FIG. 6B illustrates a first example of a current/force versus displacement graph for the second actuator 26. The line 604 illustrates how the position of the housing 243 (and the one or more optical elements 28 contained therein) changes as the current that is input into the second actuator 26 changes. When no current is supplied to the second actuator 26, the second actuator 26 is configured to bring the one or more optical elements to the rest position 72 (situated at the origin of the graph in FIG. 6B).

In the illustrated example, the force applied to the one or more optical elements 28 by the second actuator 24 varies linearly with the position of the one or more optical elements 28.

As mentioned above, the second actuator 26 is used to improve the positional control of the one or more optical elements 28, compared with using only the first actuator 24. The second actuator 26 assists the first actuator 24 in controlling the movement of the one or more optical elements 28.

In embodiments of the invention, the first actuator 24 is used to control the position of the one or optical elements 28 across their whole range of movement, from their lowermost (infinity) position 75 to their uppermost (macro) position 73. The second actuator 26, however, is configured to assist the first actuator 24 in controlling the position of the one or more optical elements 28 across only a sub-range of the whole range of movement of the one or more optical elements 28.

In the example illustrated in FIGS. 6A and 6B, the first actuator 24 is configured to drive the one or more optical elements 28 from the rest position 72 across the first displacement D1 to the macro position 73. The second actuator 26 is configured to assist the first actuator 24 in controlling the movement of the one or more optical elements 28 across a portion, but not all, of the first displacement D1. In the illustrated example, the second actuator 26 is configured to assist the first actuator 24 in controlling the movement of the one or more optical elements from the rest position 72 to the position $r_1$ indicated in FIGS. 6A and 6B.

The first actuator 24 is also configured to drive the one or more optical elements 28 from the rest position 72 across the second displacement D2 to the infinity position 75. The second actuator 26 is configured to assist the first actuator 24 in controlling the movement of the one or more optical elements 28 across a portion, but not all, of the second displacement D2. In the illustrated example, the second actuator 26 is configured to assist the first actuator 24 in controlling the movement of the one or more optical elements from the rest position 72 to the position $r_2$ indicated in FIGS. 6A and 6B.

In this implementation, the second actuator 26 is configured to compensate for the non-linearity in the driving force provided by the first actuator 24. The first actuator 24 and the second actuator 26 may be configured such that the driving force provided by the combination the first actuator 24 and the second actuator 26 varies linearly with the position of the one or more optical elements 28. This is illustrated in FIG. 6C. The line 605 relates to the force provided by the combination of the first and second actuators 24, 26, versus the displacement of the one or more optical elements 28.

FIGS. 7A to 7C illustrate an alternative example of the invention to that illustrated in FIGS. 6A to 6C. FIG. 7A illustrates a force/current versus displacement graph, relating to the first actuator 24, for the alternative example. FIG. 7B illustrates a force/current versus displacement graph, relating to the second actuator 26, for the alternative example. FIG. 7C illustrates a force/current versus displacement graph, relating to the combination of the first and second actuators 24, 26, for the alternative example.

In this example, the first actuator 24 may be the same or similar to that illustrated in FIG. 4. The second actuator 26 may be the same or similar to that illustrated in FIGS. 5A to 5E.

In the FIG. 7A to 7C example, each of the first and second actuators 24, 26 drives the one or more optical elements 28 across the first and second displacements D1, D2 in a different manner to that illustrated in FIGS. 6A to 6C.

It can be seen that from FIG. 7A that, in this example, when the one or more optical elements 28 are moved from the rest position 72 in the first direction 70 (towards the macro position 73), the first actuator 24 initially provides a force in the second direction 71 (represented by –F and substantially opposite to the first direction 70) and then provides a force in the first direction 70 (+F). While a force is being provided in the second direction 71 by the first actuator 24, it is counteracted by a force provided in the first direction 70 by the second actuator 26. The magnitude of the force provided by the second actuator 26 is larger than that provided by the first actuator 24, resulting in movement of the one or more optical elements 28 in the first direction 70, towards the macro position 73. FIG. 7B illustrates that the force provided by the second actuator 26 is substantially constant from a position close to the rest position 72 to the position $r_1$.

It can also be seen from FIG. 7A that, in this example, when the one or more optical elements 28 are moved from the rest position 72 in the second direction 71 (towards the infinity position 75), the first actuator 24 initially provides a force in the first direction 70 (represented by +F and substantially opposite to the second direction 71) and then provides a force in the second direction 71 (–F). While a force is being provided in the first direction 70, it is counteracted by a force provided in the second direction 71 by the second actuator 26. The magnitude of the force provided by the second actuator 26 is larger than that provided by the first actuator 24, resulting in movement of the one or more optical elements 28 in the second direction 71, towards the infinity position 75. FIG. 7B illustrates that the force provided by the second actuator 26 is substantially constant from a position close to the rest position 72 to the position $r_2$.

A further advantage of the implementation of the invention illustrated in FIGS. 7A to 7C is that the first and second actuators 24, 26 provide strong counteracting forces close to the rest position 72 which hold the one or more optical elements 28 in place. This may, for example, mitigate or prevent vibration of the one or more optical elements 28 around the rest position 72 in response to user handshake (e.g. when capturing an image).

No current is applied to the first and second actuators 24, 26 to hold the one or more optical elements 28 in position when they are at the rest position 72. In such a situation, in order to mitigate/prevent vibration of the one or more optical elements 28 due to user handshake, the processor 12 may be configured to control the first and second actuators 24, 26 to move the one or more optical elements 28 in discrete steps, such that the rest position 72 is positioned intermediate two adjacent steps. A consequence of this is that the one or more optical elements 28 are never positioned at the rest position 72 when the apparatus 20 is in an image capturing mode.

The distance between two adjacent steps may be so small that placement of the one or more optical elements 28 at a position intermediate two steps, if it were possible, would not result in any user perceivable improvement in image sharpness.

A second example of a method according to embodiments of the invention will now be described with reference to FIG. 8. Consider a situation in which a user wishes to capture an image of an object that is close up. The apparatus 20 enters an image capturing mode and the user instructs the apparatus 20 to focus on the object. At block 51 of FIG. 6, the processor 12 controls the first actuator 24 (for instance, via the drive circuitry 22) to drive the one or more optical elements 28 across a first displacement D1, from the rest position 72. The driving force applied by the first actuator 24 is in accordance with the graph in FIG. 6A or FIG. 6B.

The processor 12 also controls (for instance, via the drive circuitry 22) the second actuator 26 to assist the first actuator 24 in controlling movement of the one or more optical elements 28 across a portion, but not all, of the first displacement D1. If the driving force applied by the first actuator 24 is in accordance with the graph in FIG. 6A, the driving force applied by the second actuator 26 is in accordance with the graph in FIG. 6B. If the driving force applied by the first actuator 24 is in accordance with the graph in FIG. 7A, the driving force applied by the second actuator 26 is in accordance with the graph in FIG. 7B.

Over the course of the first displacement D1, the combination of the first actuator 24 and the second actuator 26 provides a driving force that varies linearly with the position of the one or more optical elements 28. The second actuator 26 compensates for the non-linearity in the driving force provided by the first actuator 24.

The user captures the image, and causes the apparatus 20 exit the image capturing mode. At block 52 of FIG. 6, the one or more optical elements 28 are brought back to the rest position 72 by the resilient biasing of the first and second actuators 24, 26.

The user later wishes to capture an image of an object that is far away. The apparatus 20 enters an image capturing mode and the user controls the apparatus 20 to focus on the object.

At block 53 of FIG. 6, the processor 12 controls the first actuator 24 to drive the one or more optical elements 28 across a second displacement D2, from the rest position 72. The driving force applied to the first actuator 24 is in accordance with the graph in FIG. 6A or FIG. 6B.

The processor 12 also controls (for instance, via the drive circuitry 22) the second actuator 26 to assist the first actuator 24 in controlling movement of the one or more optical elements 28 across a portion, but not all, of the second displacement D2. If the driving force applied by the first actuator 24 is in accordance with the graph in FIG. 6A, the driving force applied by the second actuator 26 is in accordance with the graph in FIG. 6B. If the driving force applied by the first actuator 24 is in accordance with the graph in FIG. 7A, the driving force applied by the second actuator 26 is in accordance with the graph in FIG. 7B.

Over the course of the second displacement D2, the combination of the first actuator 24 and the second actuator 26 provides a driving force that varies linearly with the position of the one or more optical elements 28. The second actuator 26 compensates for the non-linearity in the driving force provided by the first actuator 24.

The user captures the image, and causes the apparatus 20 exit the image capturing mode. At block 54 of FIG. 6, the one or more optical elements 28 are brought back to the rest position 72 by the resilient biasing of the first and second actuators 24, 26.

References to 'computer-readable storage medium', 'computer program product', 'tangibly embodied computer program' etc. or a 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The blocks illustrated in FIGS. 3 and 8 may represent steps in a method and/or sections of code in the computer program code 16. The illustration of a particular order to the blocks does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed. For example, the first actuator 24 need not have the structure illustrated in FIG. 4.

The permanent magnet arrangement 80 illustrated in FIGS. 5A to 5E might be a north-south-north arrangement rather than a south-north-south arrangement. Alternatively, in some embodiments, the permanent magnet arrangement 80 might have just an upper pole and an unlike lower pole, with no intermediate poles.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus, comprising:
one or more optical elements;
a first actuator, comprising a first permanent magnet, configured to drive the one or more optical elements from a rest position across a first displacement, and configured to drive the one or more optical elements from the rest position across a second displacement, different from the first displacement; and
a second actuator, comprising a second permanent magnet different from the first permanent magnet, configured to assist the first actuator in controlling movement of the one or more optical elements across a portion, and not all, of the first displacement, and configured to assist the first actuator in controlling movement of the one or more optical elements across a portion, and not all, of the second displacement,
wherein the first actuator and the first permanent magnet are separate and distinct from the second actuator and the second permanent magnet.

2. The apparatus as claimed in claim 1, wherein the first actuator is configured to provide a driving force, to move the one or more optical elements, which varies non-linearly with the position of the one or more optical elements.

3. The apparatus as claimed in claim 2, wherein the second actuator is configured to provide a driving force that compensates for the non-linearity in the driving force provided by the first actuator.

4. The apparatus as claimed in claim 3, wherein the first actuator and the second actuator are configured such that a combined driving force provided by the combination of the first actuator and the second actuator varies linearly with the position of the one or more optical elements.

5. The apparatus as claimed claim 1, wherein the first actuator is biased to bring the one or more optical elements towards the rest position when no electrical current is supplied to the first actuator.

6. The apparatus as claimed in claim 1, wherein the second actuator is biased to bring the one or more optical elements towards the rest position when no electrical current is supplied to the second actuator.

7. The apparatus as claimed in claim 1, wherein the first actuator is configured to drive the one or more optical elements, from the rest position, across the first or second displacement depending upon the direction of electrical current supplied to the first actuator, and wherein the second actuator is configured to drive the one or more optical elements, from the rest position, across the first or second displacement depending upon the direction of electrical current supplied to the second actuator.

8. The apparatus as claimed in claim 1, wherein the first displacement is in an opposite direction to the second displacement.

9. The method as claimed in claim 8, wherein the first actuator is biased to bring the one or more optical elements towards a rest position when no electrical current is supplied to the first actuator.

10. A method, comprising:
moving one or more optical elements from a rest position across a first displacement, wherein a first actuator, comprising a first permanent magnet, drives the one or more optical elements across the first displacement and a second actuator, comprising a second permanent magnet different from the first permanent magnet, assists the first actuator to control movement of the one or more optical elements across a portion, and not all, of the first displacement; and
moving the one or more optical elements from the rest position across a second displacement, different from the first displacement, wherein the first actuator drives the one or more optical elements across the second displacement and the second actuator assists the first actuator to control movement of the one or more optical elements across a portion, and not all, of the second displacement,
wherein the first actuator and the first permanent magnet are separate and distinct from the second actuator and the second permanent magnet.

11. The method as claimed in claim 10, wherein a driving force provided by the first actuator to move the one or more optical elements varies non-linearly with the position of the one or more optical elements.

12. The method as claimed in claim 11, wherein the second actuator provides a driving force that compensates for the non-linearity in the driving force provided by the first actuator.

13. The method as claimed in claim 12, wherein a combined driving force provided by the combination of the first actuator and the second actuator varies linearly with the position of the one or more optical elements.

14. The method as claimed in claim 13, wherein the second actuator is biased to bring the one or more optical elements towards the rest position when no electrical current is supplied to the first actuator.

15. A non-transitory computer readable medium storing computer program code that is configured to, working with at least one processor, cause the method as claimed in claim 10 to be performed.

16. An apparatus, comprising:
at least one processor; and
at least one memory storing computer program code, wherein the computer program code is configured to, with the at least one processor, cause the apparatus to at least:
control a first actuator to provide a first driving force to drive one or more optical elements, in a first direction, from a rest position across a first displacement, wherein the rate of change of the first driving force that the first actuator is able to provide to the one or more optical elements is lower across a portion of the first displacement than across a further portion of the first displacement, such that the magnitude of the first driving force varies non-linearly with displacement of the one or more optical elements from the rest position in the first direction; and
control a second actuator to assist the first actuator to control movement of the one or more optical elements by providing a second driving force to drive the one or more optical elements, in the first direction, across the portion of the first displacement and not the further portion of the first displacement, such that the magnitude of a combined driving force provided by the first driving force and the second driving force varies linearly with displacement of the one or more optical elements across the portion and the further portion of first displacement.

17. The apparatus as claimed in claim 16, wherein the computer program code is configured to, with the at least one processor, cause the apparatus to at least:

control the first actuator to provide a third driving force to drive one or more optical elements, in a second direction, from the rest position across a second displacement, wherein the rate of change of the second driving force that the first actuator is able to provide to the one or more optical elements is lower across a portion of the second displacement than across a further portion of the second displacement, such that the magnitude of the third driving force varies non-linearly with displacement of the one or more optical elements from the rest position in the second direction; and control the second actuator to assist the first actuator to control movement of the one or more optical elements by providing a fourth driving force to drive the one or more optical elements, in the second direction, across the portion of the second displacement and not the further portion of the second displacement, such that the magnitude of a combined driving force provided by the third driving force and the fourth driving force varies linearly with displacement of the one or more optical elements across the portion and the further portion of second displacement.

18. The apparatus as claimed in claim 16, wherein the first actuator comprises a first permanent magnet and the second actuator comprises a second permanent magnet, different from the first permanent magnet.

* * * * *